Patented Nov. 7, 1950

2,528,592

UNITED STATES PATENT OFFICE 2,528,592

PROCESS FOR THE PRODUCTION OF DIMERIC CONDENSATION PRODUCTS FROM UNSATURATED ALDEHYDES

Reginald Harold Hall, Sutton, and Karl Heinrich Walter Tuerck, Banstead, England, assignors to The Distillers Company, Limited, a British company No Drawing. Application February 18, 1947, Serial No. 729,396. In Great Britain March 4, 1946

10 Claims. (Cl. 260—601)

This invention is for improvements in or relating to a process for the production of dimeric condensation products from unsaturated aldehydes.

The expression "dimeric" used in the specification and claims refers to the product produced by condensation of two molecules of a substance which product has, in a single molecule, double the number of carbon atoms contained in one molecule of the starting material.

It is well known that alpha-methyl acrolein, as well as some beta-substituted acroleins, is very unstable and is susceptible to auto-polymerisation resulting in the formation of infusible and insoluble solid polymers. It has also been stated in the United States Patent No. 2,212,894 that alkali metal hydroxides act as polymerising agents for said acrolein homologues.

In Monatsheft für Chemie (1903) page 155 it has been shown that when potassium hydroxide is allowed to react with alpha-methyl-beta-ethyl-acrolein, there are formed alpha-methyl-beta-ethylacrylic acid and/or its ester with a 1:2-glycol containing twice the number of carbon atoms of the initial acrolein. On prolonged action of an excess of alkali the methyl-ethyl-acrylic-ester is saponified to the corresponding acid salt and a dimeric 1:2-glycol.

We have now found that when alkali metal hydroxides are added to homologues of acrolein which contain secondary carbon atoms attached both to the alpha and to the beta carbon atoms of the acrolein residue, an entirely different result is obtained from that which would be expected from a knowledge of the polymerisability of alpha-methyl acrolein, which result is also entirely different from the results reported in the above-mentioned literature reference, and which is that there is produced a "dimeric" monoaldehyde and/or the alkali metal salt of a monobasic hydroxy acid with double the number of carbon atoms of the initial aldehyde.

According to the present invention, therefore, there is provided a process for the production of dimeric condensation products of unsaturated aldehydes which comprises treating an alpha-beta disubstituted acrolein, having a secondary carbon atom attached to each of the alpha and beta carbon atoms of the acrolein residue, in the liquid phase with a solution of an alkali metal hydroxide. The reaction products comprise the corresponding mono-hydroxy unsaturated monoaldehyde of the same empirical formula but double the molecular formula of the initial aldehyde treated and/or an alkali metal salt of the corresponding dihydroxy monobasic acid derived from the said monohydroxy unsaturated monoaldehyde by the addition thereto of the elements of water. We have not detected in the reaction mixture any ester of glycol such as are referred to in the above-mentioned literature reference.

Acidification of the salt of the acid yields a lactone due to the elimination of water.

The reaction may be carried out in aqueous suspension or preferably in aqueous-alcoholic or alcoholic solution. Lower aliphatic monohydric alcohols such as methyl and ethyl alcohol may be used with advantage. When alkali metal hydroxides are used in aqueous solution the reaction proceeds but concurrently a fairly large proportion of condensation products of a resinous nature are formed. A preferred temperature for performing the reaction is a temperature ranging from about 0° to 30° C., but an elevated temperature of say 50° C. to 80° C. may also be employed. When allowing the alkali metal hydroxide to act upon the unsaturated aldehyde according to the invention apparently condensation to the dimeric aldehydic and acidic compounds proceeds at the same time. However, when the reaction is interrupted after a short time the dimeric aldehyde predominates in the product, whilst prolonged treatment increases the proportion of the salt of the acid in relation to that of the dimeric aldehyde in the product obtained. In order to reduce the formation of resinous and coloured matter during the condensation reaction the condensation is carried out with advantage in an inert atmosphere e. g. in an atmosphere of nitrogen or methane. The amount of alkali metal hydroxide used in the reaction may vary within very wide limits, but advantageously a ratio of one molecule or more of the hydroxide to one molecule of aldehyde is used.

We have found, furthermore, that the dimeric aldehyde may be converted into the salt of the said acid, for instance, by further treatment with alkali metal hydroxide in aqueous alcoholic solution. This might indicate that the dimeric aldehyde is an intermediate in the formation of the acid. By mild hydrogenation of the dimeric aldehyde in the liquid phase, for instance in the presence of Raney nickel at a slightly elevated temperature, the related glycol is formed. On the other hand, when the hydrogenation is carried out under more vigorous conditions a hydrogenated glycol is produced. The production of both these glycol compounds forms part of the present invention.

A number of tests and experiments were carried out in order to establish the constitution of the condensation products obtained by carrying our invention into effect. The result of these tests tend to show that there is a free, unlactonised hydroxy group in the lactone and that this hydroxy group is a primary one.

The products obtained, including the calcium salt of the hydroxy acid, are soluble in hydrocarbons and may be used as intermediates in the preparation of detergents, emulsifiers, plasticisers and the like.

When alpha-ethyl beta propylacrolein is subjected to the condensation treatment by bringing it into contact with alkali metal hydroxide solutions according to our invention a neutral aldehyde of the empirical formula $C_{16}H_{28}O_2$ and the alkali salt of an acid $C_{16}H_{32}O_4$ are formed. Acidification of the alkali salt furnishes a lactone of the empirical formula $C_{16}H_{30}O_3$.

The following examples serve to illustrate the way in which the condensation of alpha-ethyl beta-propylacrolein is carried out, they also give methods of preparing the glycol and hydrogenated glycol from the aldehyde condensation product obtained.

*Example 1.—Preparation of aldehyde: $C_{16}H_{28}O_2$*

200 ccs. of redistilled alpha-ethyl-beta-propylacrolein were added with stirring during three minutes to an aqueous-alcoholic solution of potassium hydroxide, consisting of 80 ccs. water, 300 ccs. of ethanol and 80 g. of potassium hydroxide, in a closed vessel, a slow stream of nitrogen being passed through the apparatus. The mixture was stirred at room temperature for one hour and poured into 2 litres of water. The oil which separated was extracted twice with other (first with 500 cc. and then with 100 cc. of ether).

The combined ether extracts were washed several times with cold water, dried over sodium sulphate and filtered. The ether was removed from the filtrate by distillation and the residual yellow oil, which amounted to 139 g. was fractionated in vacuo under nitrogen. About 56 g. of low boiling material (mainly unchanged ethylpropylacrolein) were first collected and a second fraction, consisting of the C16-aldehyde, was collected as a pale yellow oil weighing 54 g.

The residual higher boiling liquid amounted to 28 g. Redistillation of the C16-aldehyde gave an almost colourless liquid, B. P. 117° C./2 mm.; $n_D^{20}=1.4995$. (Found: C, 75.6; H, 11.1. $C_{16}H_{28}O_2$ requires C, 76.15; H, 11.2%.)

The pure C16-aldehyde on titration with hydroxylamine was found to have an equivalent of 251 (for one-CHO group). Theoretical value = 252.

*Example 2.—Preparation of lactone $C_{16}H_{30}O_3$*

200 ccs. of redistilled alpha-ethyl beta-propylacrolein was added dropwise during 30 minutes to a stirred aqueous alcoholic solution of potassium hydroxide, consisting of 40 ccs. of water, 150 ccs. of ethanol and 40 g. of potassium hydroxide, contained in a closed flask, a slow stream of nitrogen being passed through the apparatus. The reaction flask was cooled in cold water. Immediately the reaction was started, a yellowish-orange colour developed in the mixture. Stirring was continued for 2½ hours after all the ethylpropyl acrolein had been added and then a further equal quantity of the above potassium hydroxide solution was added. The stirring was continued for a further 21 hours, the reaction mixture was poured into 2 litres of water and the oil which separated out was extracted with 500 ccs. of ether.

The aqueous residue was acidified with strong hydrochloric acid, added dropwise with stirring, and the oil which separated was extracted with 600 cc. of ether. The ether extract was washed with cold water, dried over sodium sulphate and filtered. The ether was removed from the filtrate by distillation and the residual 141 g. of yellow oil consisting of the crude C16 lactone was fractionated in vacuo under nitrogen. After a small forerun the C16-lactone was collected as an almost colourless oil, Yield=110 g.; B. P. 165° C./2 mm. Hg., $n_D^{20}=1.4780$. (Found: C, 70.8; H, 11.15. $C_{16}H_{30}O_3$ requires C, 71.05; H, 11.2%.)

Instead of isolating the C16-acid as its lactone it may be isolated in the form of its calcium salt as follows: The aqueous solution of the potassium salt, containing an excess of potassium hydroxide and some ethanol, was carefully neutralised with hydrochloric acid (using phenolphthalein as indicator) and evaporated in vacuo to remove ethanol and traces of ether. The concentrated aqueous solution thus obtained was treated with an excess of a concentrated aqueous solution of calcium chloride, the white flocculent calcium salt which was precipitated was collected, washed with water and dried. The calcium salt which amounted to 145 to 150 g. is a white solid which can be crushed to a white powder. (Found: Ca, 6.4; $(C_{16}H_{31}O_4)_2Ca$ requires Ca, 6.5%.)

*Example 3.—Conversion of the $C_{16}$-aldehyde into the $C_{16}$-lactone*

A solution of 16 g. of potassium hydroxide in a mixture of 16 ccs. of water and 60 ccs. of ethanol was added to 30 g. of the C16-aldehyde produced in Example 1. The mixture was shaken thoroughly and allowed to stand under nitrogen for 24 hours. The reddish-orange coloured mixture was poured into 400 ccs. of water and the oil which separated was extracted with 150 ccs. of ether.

The residual aqueous solution was acidified with hydrochloric acid and the oil which separated was isolated with ether in the usual way. After removal of the ether, 21.6 g. of a yellow oil was obtained from which, on fractionation in vacuo under nitrogen, 16 g. of pure C16-lactone was obtained as an almost colourless oil, B. P. 162–3° C./3 mm., $n_D^{20}=1.4781$.

*Example 4.—Preparation of glycol $C_{16}H_{30}O_2$*

112 g. of the C16-aldehyde produced in Example 1 was mixed with an equal weight of n-butanol and was hydrogenated at atmospheric pressure and at a temperature of about 70° C. in the presence of 5% by weight of Raney nickel, a high speed stirrer and a continuous stream of hydrogen being employed. When about one mol of hydrogen had been absorbed the uptake of hydrogen became very slow and the hydrogenation was therefore terminated. The mixture was filtered to remove the catalyst and the latter was washed thoroughly with n-butanol.

The combined filtrate and washings were fractionated in vacuo under nitrogen. After the n-butanol had been removed 114 g. of a nearly colourless viscous oil remained from which 83 g. of an almost colourless, very viscous oil, B. P. 149–151° C./2 mm., $n_D^{20}=1.4996$, was obtained on further fractionation. (Found: C, 75.7; H, 11.9; $C_{16}H_{30}O_2$ required C, 75.5; H, 11.9%.)

A bis 3.5 dinitrobenzoate of the glycol was prepared which on crystallising from a mixture of ethyl acetate and ethanol yielded a pale creamcoloured solid, M. P. 178° C. (Found: C, 56.45; H, 5.35; N, 8.8; $C_{30}H_{34}O_{12}N_4$ requires C, 56.1; H, 5.35; N, 8.7%.)

*Example 5.—Preparation of hydrogenated glycol $C_{16}H_{32}O_2$*

70 g. of the unsaturated glycol, obtained in Example 4 was dissolved in 300 ccs. of 95% ethanol and treated with hydrogen at 120 atmospheres and 80°–100° C. in the presence of 15 g. Raney nickel for 7 hours. After filtering off the catalyst and distilling off the ethanol and water in vacuo, the residue was distilled at a pressure of 2 mm. whereby the main quantity came over at 165°–167° C. at 2 mm. Hg. having a refractive index of 1.4890 for $n_D^{20}$. (Found: C, 75.05; H, 12.55; $C_{16}H_{32}O_2$ requires C, 74.5; H, 12.6%.) This glycol is a colourless, highly viscous liquid, miscible with petroleum ether (B. P. 80°–100° C.). It has practically no bromine absorption.

The bis-3:-dinitrobenzoate prepared from this glycol crystallised from a mixture of ethyl acetate and methanol as a white, microcrystalline solid, M. P. 197° C. (Found: C, 55.9; H, 5.6; N, 9.0. $C_{30}H_{36}O_{12}N_4$ requires C, 55.9; H, 5.65; N, 8.7%.)

*Example 6.—Preparation of lactone*

200 ccs. of redistilled alpha-ethyl-beta-propyl-acrolein were added dropwise during 30 minutes to a stirred solution of 29 gms. of sodium hydroxide in 40 ccs. of water and 150 ccs. of ethanol, in a reaction flask cooled in cold water, a slow stream of nitrogen being passed through the apparatus. A yellow colour developed immediately in the solution. When all the acrolein had been added, the solution was stirred for a further 90 minutes and then a solution of 29 gms. of sodium hydroxide in 40 ccs. of water and 150 ccs. of ethanol was added. The mixture was stirred overnight, then poured into a mixture of 2 litres of water and 500 ccs. of ether and the resultant mixture was shaken thoroughly. The aqueous layer was separated and acidified with 200 ccs. of concentrated hydrochloric acid. The oil which separated was extracted with 500 ccs. of ether, the ether extract was washed with water, dried over sodium sulphate, filtered, and evaporated in vacuo. 118 gms. of the residual yellow oil was fractionated in vacuo under nitrogen when 94 gms. of pure lactone, B. P. 164–7°/2 mm.; $n_D^{20}=1.4784$, were obtained.

It is to be understood that the reference herein to a secondary carbon atom means a carbon atom having two valencies attached to two other carbon atoms and having its other two valencies attached to hydrogen atoms.

Although the invention has been described with reference to alpha-ethyl-beta-propylacrolein, that is a compound in which the secondary carbon atoms attached to the alpha and beta of the acrolein residue are attached to a methyl and an ethyl group respectively, the invention is also applicable, to compounds in which, in place of the said methyl and ethyl groups the said secondary carbon atoms are attached to other alkyl groups, whether saturated or unsaturated and either having straight or branched chains, or to aryl, aralkyl, cycloalkyl, or other hydrocarbon radicals, or substituted hydrocarbon radicals such as propyl, isopropyl-, butyl-, isobutyl-, sec.-butyl-, hexyl-, octyl-, dodecyl-, hexadecyl-, octadecyl-, octadecenyl-, allyl-, methallyl-, cinnamyl-, benzyl-, tert-butylbenzyl-, phenylethyl-, chlorophenyl-, cyclohexyl-, methylcyclohexyl-, bornyl-, naphthyl, or bromoethyl-radicals which may be the same or different.

Products disclosed herein but not claimed are claimed in copending application Serial No. 161,492, filed May 11, 1950.

What we claim is:

1. A process for the production of dimeric condensation products of unsaturated aldehydes which comprises treating a substance consisting essentially of an alpha-beta-disubstituted acrolein, having a secondary carbon atom attached to each of the alpha and beta carbon atoms of the acrolein residue, in the liquid phase with a solution of an alkali metal hydroxide, and continuing said treatment until the major reaction product is the salt of a dimeric monobasic hydroxy acid containing twice the number of carbon atoms as said disubstituted acrolein.

2. A process for the production of dimeric condensation products of unsaturated aldehydes which comprises treating a substance consisting essentially of an alpha-beta-disubstituted acrolein, having a secondary carbon atom attached to each of the alpha and beta carbon atoms of the acrolein residue, in the liquid phase with a solution, in a lower aliphatic monohydric alcohol, of an alkali metal hydroxide, and terminating said treatment while the major reaction product is a mono-hydroxy unsaturated aldehyde containing twice the number of carbon atoms as said disubstituted acrolein.

3. A process for the production of dimeric condensation products of unsaturated aldehydes which comprises treating a substance consisting essentially of an alpha-beta-disubstituted acrolein, having a secondary carbon atom attached to each of the alpha and beta carbon atoms of the acrolein residue, in the liquid phase with a solution, in a lower aliphatic monohydric alcohol, of an alkali metal hydroxide, and terminating said treatment while the major reaction product is a mono-hydroxy unsaturated aldehyde containing twice the number of carbon atoms as said disubstituted acrolein, thereafter hydrogenating said mono-hydroxy aldehyde, in the presence of Raney nickel at a temperature not exceeding 80° C., and recovering the glycol thereby produced.

4. A process for the production of dimeric condensation products of unsaturated aldehydes which comprises treating a substance consisting essentially of an alpha-beta-disubstituted acrolein, having a secondary carbon atom attached to each of the alpha and beta carbon atoms of the acrolein residue, in the liquid phase with a solution, in a lower aliphatic monohydric alcohol, of an alkali metal hydroxide, and terminating said treatment while the major reaction product is a mono-hydroxy unsaturated aldehyde containing twice the number of carbon atoms as said disubstituted acrolein, thereafter hydrogenating said mono-hydroxy aldehyde, in the presence of Raney nickel at a temperature between 80° C. and 100° C. and under superatmospheric pressure and recovering the hydrogenated glycol thereby produced.

5. A process for the production of dimeric condensation products of unsaturated aldehydes which comprises treating a substance consisting essentially of an alpha-beta-disubstituted acrolein, having a secondary carbon atom attached to each of the alpha and beta carbon atoms of the acrolein residue, in the liquid phase with a solution, in a lower aliphatic monohydric alcohol, of an alkali metal hydroxide, and terminating said treatment while the major reaction product is a mono-hydroxy unsaturated aldehyde containing twice the number of carbon atoms as said disubstituted acrolein, thereafter hydrogenating said mono-hydroxy aldehyde, in the presence of Raney nickel at a temperature between 80° C. and 100° C. and under a pressure of at least 100 atmospheres and recovering the hydrogenated glycol thereby produced.

6. A process for the production of dimeric condensation products of di-substituted acrolein which comprises, treating a substance consisting essentially of an alpha-beta di-substituted acrolein in the liquid phase with a solution of an Alkali metal hydroxide, said acrolein having secondary carbon atoms attached to each of the alpha and beta carbon atoms of the acrolein radical, and condensing said acrolein to produce at least one of the substances selected from the group consisting of the corresponding dimeric monohydroxy unsaturated aldehyde and the salt of the corresponding dimeric monobasic hydroxy acid.

7. A process for the production of dimeric condensation products of di-substituted acrolein which comprises, treating a substance consisting essentially of an alpha-beta di-substituted acrolein in the liquid phase with a solution in a lower aliphatic monohydric alcohol of an alkali metal hydroxide, said acrolein having secondary carbon atoms attached to each of the alpha and beta carbon atoms of the acrolein radical, and condensing said acrolein to produce at least one of the substances selected from the group consisting of the corresponding dimeric monohydroxy unsaturated aldehyde and the salt of the corresponding dimeric monobasic hydroxy acid.

8. A process for the production of dimeric condensation products of di-substituted acrolein which comprises, treating a substance consisting essentially of an alpha-beta di-substituted acrolein in the liquid phase with a solution of an alkali metal hydroxide, said acrolein having secondary carbon atoms attached to each of the alpha and beta carbon atoms of the acrolein radical, condensing from said acrolein the corresponding dimeric monohydroxy unsaturated aldehyde and hydrogenating said aldehyde to produce a corresponding glycol.

9. A process in accordance with claim 6 in which the reaction is carried out at a temperature between 0 and 80° C. and in which at least one molecule of alkali metal hydroxide to each molecule of said di-substituted acrolein is employed.

10. A process for the production of dimeric condensation products of di-substituted acrolein which comprises, treating a substance consisting essentially of an alpha-ethyl-beta-propylacrolein in the liquid phase with a solution of an alkali metal hydroxide in an amount equal to at least one molecule of alkali metal hydroxide for each molecule of said acrolein and producing at least one of the substances selected from the group consisting of the dimeric aldehyde having the formula $C_{16}H_{28}O_2$, and an alkali metal salt of the dimeric monobasic hydroxy acid having the formula $C_{16}H_{32}O_4$.

REGINALD HAROLD HALL.
KARL HEINRICH WALTER TUERCK.

REFERENCES CITED

The following references are of record in the file of this patent:

UNITED STATES PATENTS

| Number | Name | Date |
|---|---|---|
| 1,716,822 | Knorr et al. | June 11, 1929 |
| 2,060,267 | Toussaint | Nov. 10, 1936 |

FOREIGN PATENTS

| Number | Country | Date |
|---|---|---|
| 643,341 | Germany | Jan. 26, 1933 |

OTHER REFERENCES

Zalkind Chem. Abstr., vol. 30, cols. 3407, 3408 (1936).

Certificate of Correction

Patent No. 2,528,592                                                November 7, 1950

REGINALD HAROLD HALL ET AL.

It is hereby certified that error appears in the printed specification of the above numbered patent requiring correction as follows:

Column 3, line 38, for the word "other" read *ether*; column 4, line 70, for "1.4996" read *1.4966*; column 5, line 22, for "bis-3:-" read *bis-3:5-*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
                                                        *Assistant Commissioner of Patents.*